United States Patent [19]

Godoy

[11] 3,987,889
[45] Oct. 26, 1976

[54] DISTRIBUTOR MECHANISM FOR ARTICLES COMING OFF A CONVEYOR

[76] Inventor: Aurora Nieto Godoy, Felipe de Paz St., No. 12,30, Barcelona, Spain

[22] Filed: May 14, 1975

[21] Appl. No.: 577,168

Related U.S. Application Data

[63] Continuation-in-part of Ser. No. 423,225, Dec. 10, 1973, abandoned.

[30] Foreign Application Priority Data

Dec. 18, 1972  Spain .................................. 409751

[52] U.S. Cl. ............................... 198/456; 198/495; 198/655; 198/747
[51] Int. Cl.² ......................................... B65G 47/26
[58] Field of Search ............ 198/24, 29, 30, 31 AB, 198/34; 214/6 A

[56] References Cited
UNITED STATES PATENTS

| | | | |
|---|---|---|---|
| 1,654,706 | 1/1928 | Schoen ................................. | 198/24 |
| 3,480,161 | 11/1969 | Bason .................................. | 214/6 A |
| 3,589,495 | 6/1971 | Pearne et al. ........................ | 214/6 A |

Primary Examiner—Evon C. Blunk
Assistant Examiner—Jeffrey V. Nase
Attorney, Agent, or Firm—Robert E. Burns; Emmanuel J. Lobato; Bruce L. Adams

[57] ABSTRACT

A system for transferring articles from a conveyor into individually predetermined, mutually spaced positions comprises an elongate platform with means for receiving thereon a predetermined number of articles delivered by a conveyor as a row of articles in contact with one another. An elongate rod extends longitudinally of the elongate platform, laterally of and beyond the row of articles. Transfer blocks, correspondng to the predetermined number of articles, are disposed as a row wherein each transfer block is shiftably mounted on the elongate rod, each block having an article-engaging member to enable shifting of the articles, by the transfer blocks along the rod. Link means are provided, to limit the shifting so as to start in a first condition of the row of blocks, wherein the blocks are located opposite respective articles disposed in mutually contacting positions, and to end in a second condition of the row of blocks wherein the row of blocks is stretched out along the elongate rod, thereby shifting the articles, engaged by the blocks, into predetermined, mutually spaced positions controlled by the link means. The row of blocks is then shifted from the platform. While this is done the articles are held against tumbling.

11 Claims, 5 Drawing Figures

DISTRIBUTOR MECHANISM FOR ARTICLES COMING OFF A CONVEYOR

CROSS-REFERENCE TO EARLIER APPLICATION

This is a Continuation-in-Part of the present applicant's earlier application, Ser. No. 423,225, filed Dec. 10, 1973, now abandoned.

BACKGROUND OF THE INVENTION

This invention relates to a distributor mechanism for articles coming off a moving or transfer surface.

At present, bottles and other articles, objects or pieces coming off a moving surface, such as a conveyor belt, are collected on a platform and from there they are dragged vertically towards a gathering point by means of a cross piece.

This system has the drawback that all the pieces that are to be transferred are placed contiguously and touch one another, and there is no distribution of the pieces on the receiving surface. Distribution must be carried out manually on said surface once the pieces have been already transferred.

SUMMARY OF THE INVENTION

In order to avoid this manual operation, the distributing mechanism of the invention has been devised, whereby the pieces or elements delivered by the moving or transfer surface will be distributed according to a previously determined order and according to the needs of the receiving surface.

One of the applications of this mechanism would be the distribution of bottles in rows, in such a manner that in one operation several rows of different numbers of bottles are formed simultaneously, in the same time which it would take to form one.

BRIEF DESCRIPTION OF THE DRAWINGS

In order to give a correct interpretation of the present invention, the following example of practical realization, with non-limitative effect on the nature of the invention, is illustrated in the drawings, in which.

DESCRIPTION OF THE PREFERRED EMBODIMENTS OF THE INVENTION

Figure 2:
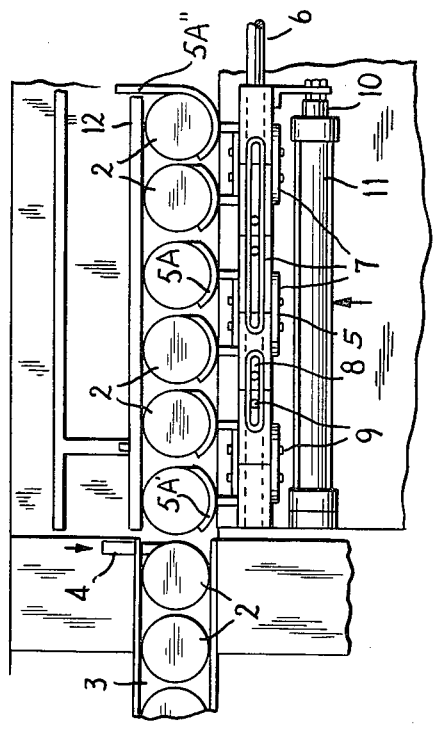
FIGS. 1 and 2 are plan views which schematically show a first embodiment of the new mechanism, in two different stages of operation.
Figure 1:
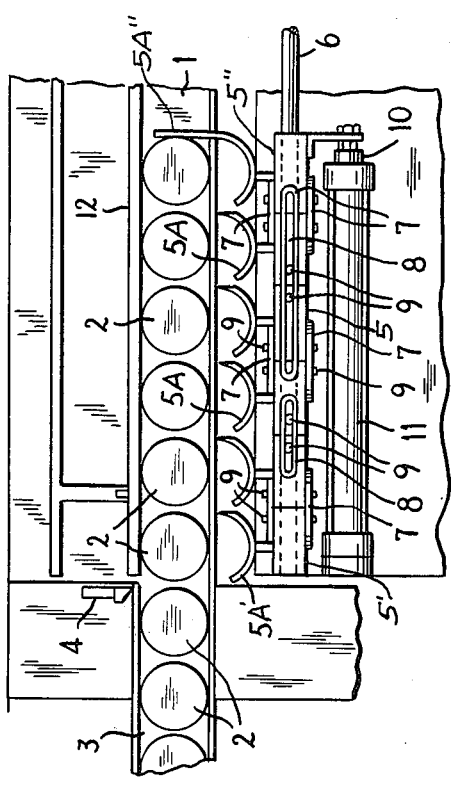
Figure 3:
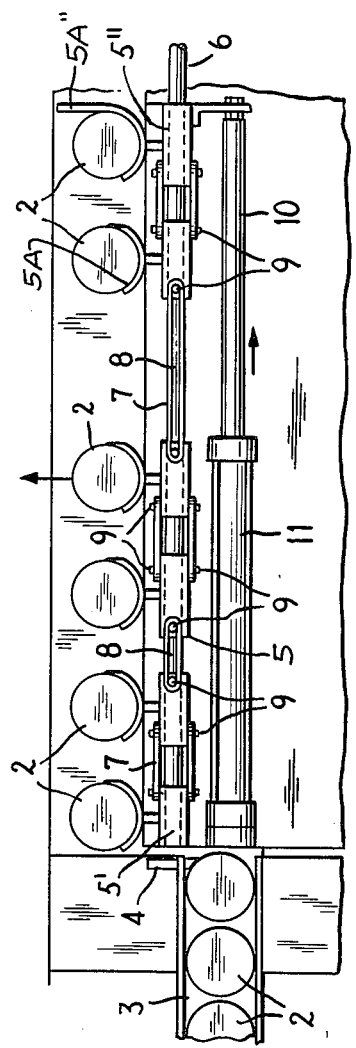
FIG. 3 is a similar view showing such a mechanism in a third stage of operation.

In the apparatus of FIGS. 1 to 3 an elongated distribution and transfer platform 1 receives articles, such as uniform bottles 2, from a conveyor 3. The bottles stand on a horizontal moving surface of the conveyor, and are horizontally shifted by the conveyor onto a stationary, horizontal surface of the platform. As shown in FIGS. 1 and 2 the bottles are close to one another, or (FIG. 4) in contact with one another, when received on platform 1, being similarly disposed on conveyor 3. When a predetermined number of bottles has been shifted onto the platform, a gate 4 is inserted, adjacent conveyor 3, and across its travel, at the inlet end of platform 1, to close off the introduction of any additional bottles onto platform 1, in order to initiate and enable distribution of the predetermined number of bottles on platform 1 and the further handling of the distributed bottles.

For such distribution and handling, the new apparatus as shown in FIGS. 1 to 3 comprises a row of distribution and transfer blocks 5 movable disposed along platform 1, each block having bottle-engaging extensions 5A thereon for laterally engaging one of the bottles 2 on the platform to shift the engaged bottle first along the later across the platform. The row of distribution and transfer block 5 extends along platform 1, and the blocks of the row can contact one another endwise, at which time the length of the row of blocks equals the length of the row of bottles 2 on the platform; the blocks being mutually uniform and being provided in a number corresponding to the predetermined number of bottles 2 received on the platform 1 upon the opening of gate 4; for example FIG. 1 shows a row of six blocks along the platform for a row of six bottles on the platform. The blocks are guided by a longitudinal rod 6 which is mounted by suitable means 6' on an auxiliary platform 6''.

Figure 4:
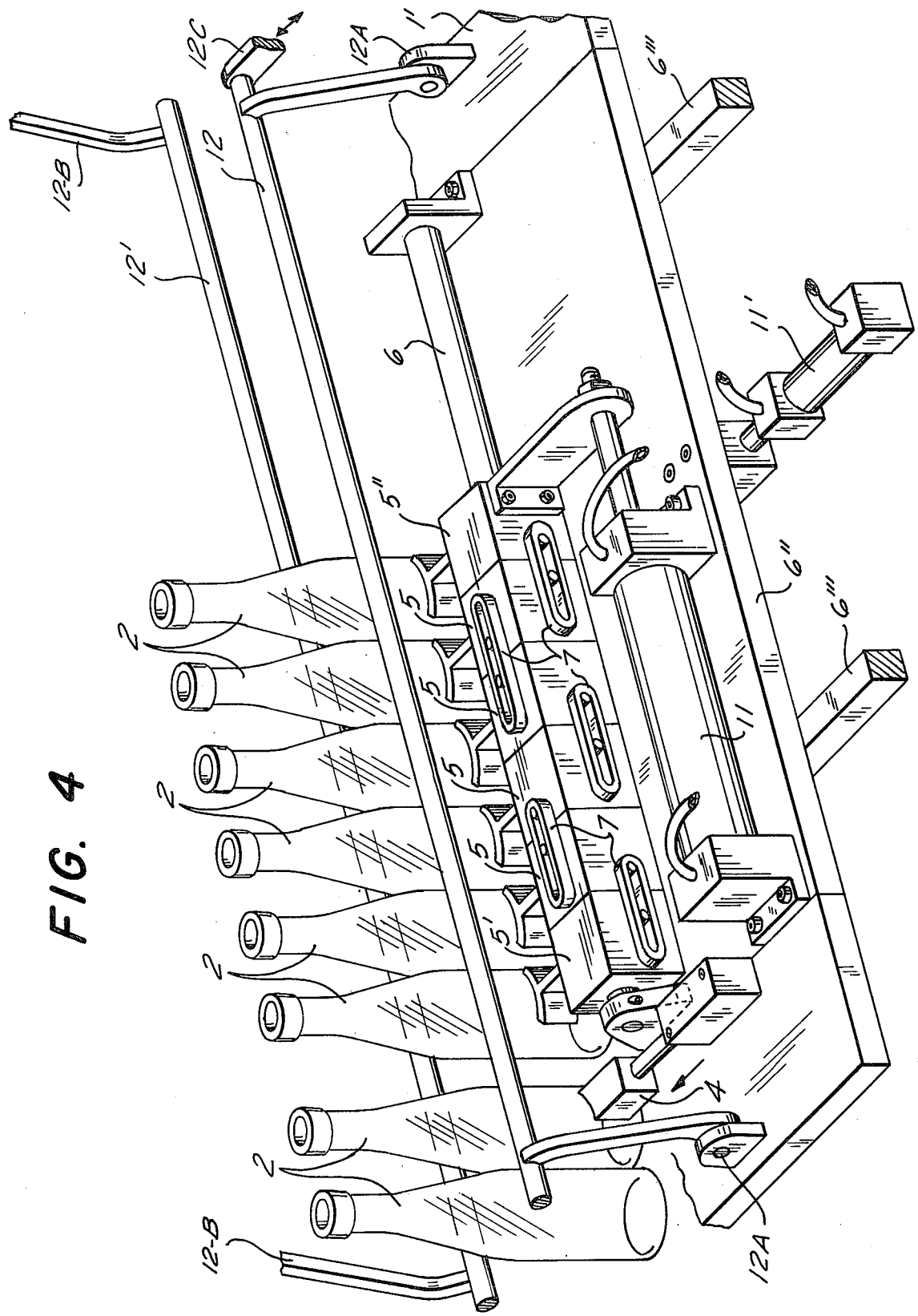
FIG. 4 is a perspective view of a second embodiment of the new mechanism in one stage of operation.
Figure 5:
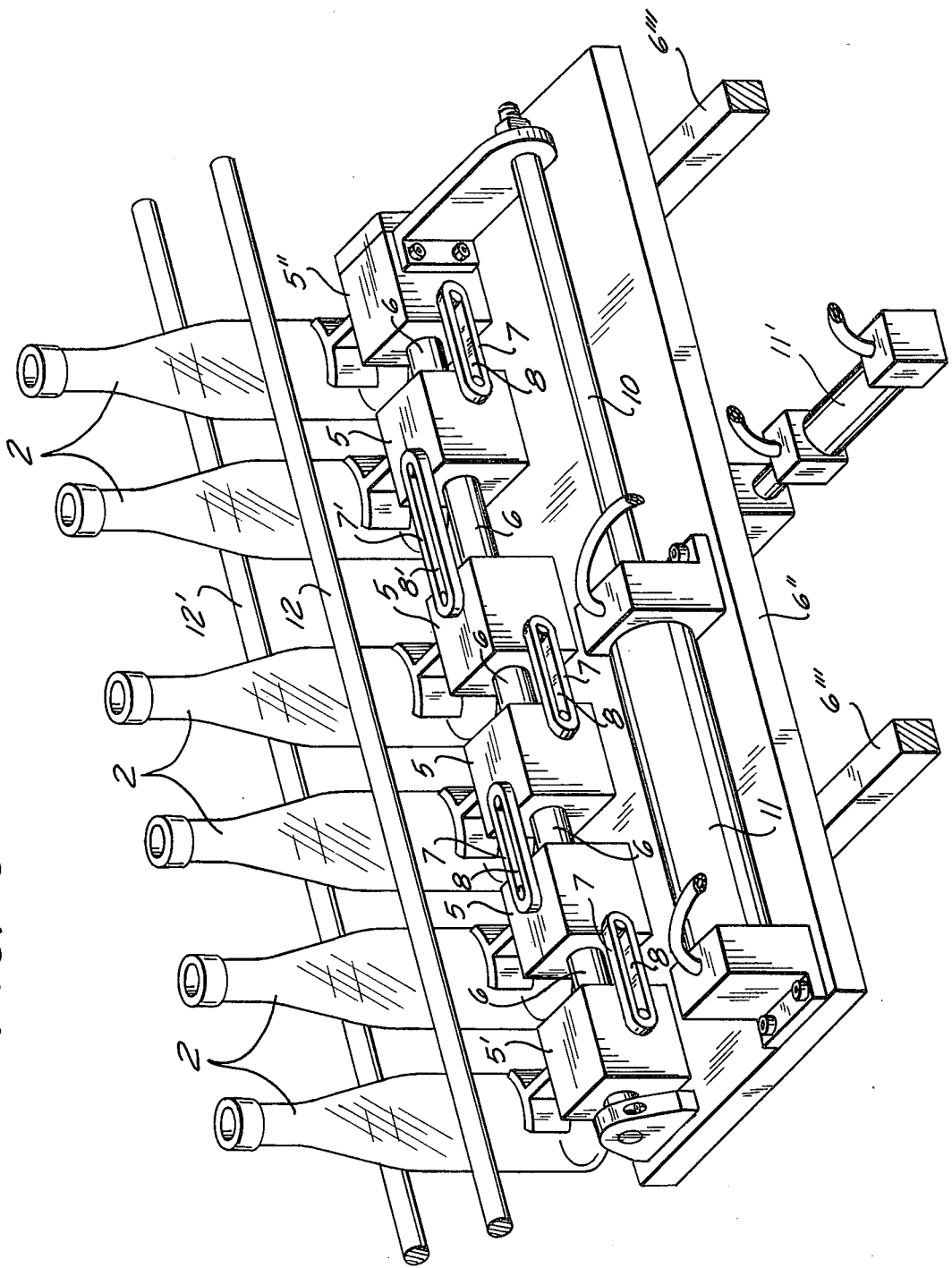
FIG. 5 is a similar partial view, showing another stage of operation of the second embodiment.

This platform is movably supported on guidebars 6''', as best shown in FIG. 4. As shown in FIG. 1 auxiliary platform 6'' with rod 6 and blocks 5 thereon extends along the bottle-receiving and distributing platform 1, and is initially transversely spaced therefrom; however, as shown in FIG. 2, the auxiliary platform 6'' can be moved transversely toward platform 1 and into contact therewith. Rod 6 can be rigidly mounted on platform 6'', slightly above the same and above platform 1, so that the bottle engaging extensions 5A on blocks 5, engage the bottles 2 a suitable distance above platform 1. The rod extends through the blocks, from one end of the two platforms (the left end as shown) to their other end (not illustrated).

The distribution blocks 5 are disposed for individual, successive transfer motions along the guide rod 6, wherein the ultimate and maximum distances between the blocks are determined by links 7, interconnecting the blocks. For these purposes each link 7 has a slot 8 engaged by pins 9, provided on two mutually adjacent blocks, so that every two mutually adjacent blocks can slide, along rod 6, over a longitudinal maximum distance determined by the longitudinal dimension of slot 8 associated with the respective blocks; these longitudinal dimensions and distances being individually selected for the different links 7 in the row of blocks 5, for obtaining a proper pattern of distribution of bottles 2 along platform 1 (FIG. 3).

The first block 5' of the row is different from the remaining ones in that it is stationary on rod 6. The last block 5'' of the row, is shown, is secured to an extension or bracket 10' which in turn is secured to a power-source, for example to one end of a piston 10 of a fluid pressure machine such as a pneumatic cylinder 11. The last block 5'', remote from conveyor 3, has a bottle-restraining and stopping extension 5A'' thereon, which extends across the platform 1 to restrain end stop the delivery of bottles 2 by the conveyor onto the platform 1 when the predetermined number of bottles (corresponding to the number of blocks) has been received on the platform (FIG. 1). When this has been done, the piston 10 can be caused to advance (toward the right as shown) to shift bracket 10', and thereby block 5'' to the right. By means of links 7, this results in successive inception of rightward shifting of the other blocks 5. In the end the row of blocks 5'' and 5 is stretched to such extent as is possibly with links 7, having slots 8 of certain longitudinal dimensions. As a further result, the extensions 5A distribute the bottles 2 in a desired pattern, along platform 1.

As illustrated, the links 7 have slots 8 of uniform length but one link 7' has a slot 8' of greater length. This results in distributing the six bottles, shown as an example, in a first row of four bottles (at the right), separated by short, uniform distances, and a second row of two bottles (at the left), the latter bottles being separated from one another by the same distance but being separated from the first row by a longer distance.

Once that the bottles have been so distributed, providing a pattern of two separate rows, they are transversely shifted by the block extensions 5A from the distribution and transfer platform 1, to a position lateral of this platform, as indicated by the transverse arrow in FIG. 3. In this lateral position the bottles or other articles can be received in a suitable box or other receiver (not shown) for transportation or shipment. Such receivers often have individual cavities, each for receiving one bottle, and the cavities often are grouped in certain ways, for example in groups of two and four cavities for a six bottle receiver. The new distributing and transferring apparatus is easily adapted to many types of grouping, by merely interchanging links 8, 8' to suit the desired pattern. Moreover the new apparatus accurately retains the selected grouping, incident to the transfer movements effected by extensions 5A.

In many applications and uses of the new apparatus there is a danger that bottles 2 or other articles tumble and fall, when they are rapidly shifted from the distributing platform 1. In order to avoid such tumbling and falling an article-holding system of bars 12, 12' is provided. This system may be pivoted, as indicated at 12'', for movement from a first, withdrawn position (FIGS. 1 and 2) wherein only one bar 12 extends along the row of bottles 2, to a second, bottle-engaging position wherein the two bars 12, 12' engage transversely opposite sides of the row of bottles (FIG. 4). The bars 12, as shown here, may be connected to extensions 1' of distributing platform 1 by pivot means 12A. The bars 12' may also be pivotably, or if preferred flexibly, be interconnected with extensions 12', by or with bars 12, with the aid of further extensions 12B. These connections enable the bars 12, 12' to be returnably moved across and onto the distributing platform 1, for example with the aid of power-operated linkage means 12-C, to hold the individual bottles against tumbling movements thereof, transverse of the platform, subject to vertical sliding of the bars relative to the bottles. Thus the system of bars 12, 12' prevents the tumbling of individual bottles, as the bars follow the entire row of bottles and interconnect the individual bottles therein, when the bottles are shifted transversely from the platform by the block extensions 5A. It will be understood that the individual bottles 2, as delivered by conveyor 3 on platform 1, may be contacted by extensions 5A at slightly different moments, in their transverse shifting movements, and that any resulting danger of tumbling movements of individual bottles is simply and effectively overcome by the bottle-holding bars 12, 12'.

In operation the auxiliary platform 6'' (with rod 6, blocks 5 and piston-cylinder 11 thereon and with the row of blocks contracted at the left end of the rod, as shown) is initially spaced from platform 1 (FIG. 1). It is then shifted toward and into contact with the latter platform, by a transversely oriented, auxiliary cylinder and piston device 11' (FIG. 4), connected with the auxiliary platform 6'', whereby the bottle-engaging extensions 5A come into contact with the bottles 2, previously delivered onto the platform 1 (FIGS. 2, 4). Thereafter the row of distributor blocks 5 is stretched out toward the right end of the rod, by operation of cylinder 11 and piston 10, until the row reaches the limiting position or maximum separation established by slots 8 of links 7, thereby enabling the extensions 5A to correspondingly distribute bottles 2 along platform 1 (FIG. 3, 5). Next, the extension members 5A shift the bottles transversely from platform 1 into their receiver. This could be done by various means. However, as indicated in FIG. 3, it is preferably done by causing power means 11' to additionally shift the entire system of members 5A and blocks 5, on auxiliary platform 6'', transversely of the distribution and transfer platform 1.

What is claimed is:

1. Apparatus for transferring articles from a conveyor into individuallly predetermined and mutually spaced positions of the articles, comprising;

an elongate distribution platform disposed to receive a predetermined number of articles such as bottles, delivered to the platform by a conveyor, as a row, extending along the elongate platform, of articles standing in mutually close positions;

an elongate rod extending longitudinally of the elongate platform, on one side of and beyond the row of articles;

a number of transfer blocks corresponding to said predetermined number of articles and disposed as a row of transfer blocks, each transfer block being shiftably mounted on the elongate rod to enable shifting of the transfer blocks along the rod;

a plurality of links, each interconnecting two mutually adjacent transfer blocks of the row of blocks, and disposed shiftably between a first condition of the latter row wherein the blocks are located in mutually close positions, opposite respective articles, and a second condition wherein the row of blocks is stretched out along the elongate rod;

article-engaging means on each transfer block for engaging one of the delivered articles in said first condition of the row of transfer blocks, and for shifting the engaged article along the elongate platform by the shifting of the transfer blocks into said second condition of the row of transfer blocks, to establish individually predetermined, mutually spaced positions of the articles;

transverse shifting means for supporting, and returnably shifting, said rod and said row of blocks thereon transversely of said elongate platform to shift the engaged articles transversely from the platform; and means mounted on the transverse shifting means for holding the standing articles, engaged by the article-engaging means on the blocks, against tumbling of articles during the shifting of the articles transversely from the distribution platform.

2. Apparatus according to claim 1, including power means for returnably shifting the transfer blocks along the elongate rod between said first and second conditions of the row of transfer blocks.

3. Apparatus according to Claim 1, in which the transverse shifting means comprises an auxiliary platform supporting the rod and transversely shiftable relative to the elongate distribution platform.

4. Apparatus according to claim 1 including means for automatically limiting the reception of articles, delivered to the platform by the conveyor, to said predetermined number.

5. Apparatus according to claim 4 in which the limiting means comprises means for stopping a delivered article at an end of the distribution platform, remotely from the conveyor.

6. Apparatus according to claim 4 in which the limiting means comprises a gate insertable between the conveyor and the distribution platform.

7. Apparatus according to claim 1 wherein each of said links comprises an elongate member longitudinally disposed relative to the row of transfer blocks and having a longitudinal slot, and a pair of pins engaged in said slot, each pin of the pair being secured to one of the blocks.

8. Apparatus according to claim 7 in which the elongate members and their slots have generally uniform length, at least one of said members and its slot having additional length to dispose said row of blocks, in its second condition, as at least two mutually spaced groups of blocks.

9. Apparatus according to claim 1 in which said means for holding the articles against tumbling comprises a system of bars, including first and second bars respectively positionable on transversely opposite sides of the row of articles, in contact with the articles.

10. A method of transferring bottles from a conveyor into individually predetermined, mutually spaced positions of the bottles, comprising;
collecting bottles delivered by a conveyor in a distribution zone as a row of bottles standing in mutually close positions;
providing a group of bottle-engaging members parallel to the row of collected bottles, initially disposing said members in positions opposite respective ones of the collected bottles;
first moving said row of bottle-engaging members transversely of and toward said row of bottles into engagement of each member with one of the bottles;
thereupon moving said members, in engagement with the bottles, in a direction parallel to said row to space the bottles apart in individually predetermined standing positions; and
finally moving said members in engagement with the spaced bottles, in movement transverse of said row for removal of the bottles from the distribution zone, while
holding the bottles against tumbling during the transverse movement.

11. A method according to claim 10 including, for the holding of the bottles against tumbling, the steps of contacting the row of bottles with a system of bars, including bars on transversely opposite sides of the row, and moving the system of bars transversely of the distribution platform, with said members.

* * * * *